United States Patent
Pegg et al.

(10) Patent No.: US 8,955,314 B2
(45) Date of Patent: Feb. 17, 2015

(54) THERMOELECTRIC DEVICE FOR OIL TEMPERATURE CONTROL

(71) Applicant: Ford Global Technologies, LLC, Dearborn, MI (US)

(72) Inventors: Ian Graham Pegg, Chelmsford (GB); Robert Helle-Lorentzen, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 13/789,062

(22) Filed: Mar. 7, 2013

(65) Prior Publication Data

US 2013/0232951 A1   Sep. 12, 2013

(30) Foreign Application Priority Data

Mar. 8, 2012  (GB) ................... 1204083.8

(51) Int. Cl.
| | | |
|---|---|---|
| *F01N 5/02* | (2006.01) | |
| *F01N 3/02* | (2006.01) | |
| *F01N 1/00* | (2006.01) | |
| *H01L 35/30* | (2006.01) | |
| *F01N 3/021* | (2006.01) | |

(Continued)

(52) U.S. Cl.
CPC ............... *F01N 5/025* (2013.01); *F01N 3/021* (2013.01); *F01M 5/001* (2013.01); *F01M 11/0004* (2013.01); F01N 2011/0025 (2013.01); F01N 2240/36 (2013.01); Y02T 10/16 (2013.01); Y02T 10/20 (2013.01)

USPC ................... 60/320; 60/311; 60/324; 136/205

(58) Field of Classification Search
CPC ...... F01N 3/021; F01N 5/025; F01N 2240/36; F01M 5/001; F01M 5/005; F01M 11/0004; Y02T 10/166
USPC ...................... 60/311, 320, 324; 136/203, 205
See application file for complete search history.

(56) References Cited

U.S. PATENT DOCUMENTS

| | | |
|---|---|---|
| 2006/0150657 A1 | 7/2006 | Spurgeon et al. |
| 2007/0033951 A1 | 2/2007 | Goenka et al. |

(Continued)

FOREIGN PATENT DOCUMENTS

| | | |
|---|---|---|
| DE | 102008023806 A1 | 11/2009 |
| DE | 102008055946 A1 | 5/2010 |

(Continued)

*Primary Examiner* — Audrey K Bradley
(74) *Attorney, Agent, or Firm* — Greg Brown; Alleman Hall McCoy Russell & Tuttle LLP

(57) ABSTRACT

The present disclosure describes systems and methods to increase the speed of engine warm up by heating oil with a thermoelectric device and also to generate electricity using the same thermoelectric device, exploiting a temperature gradient between engine oil and exhaust gases. The disclosure describes a vehicle engine, comprising: an engine oil reservoir; an exhaust gas system; and a thermoelectric device having a hot side and a cold side and connected to a battery, wherein, the thermoelectric device is configured such that the hot side is thermally coupled to the exhaust gas system and the cold side is thermally coupled to the engine oil reservoir. A diverter valve and duct are provided in the exhaust gas system to selectively convey exhaust gases to the thermoelectric device located in or adjacent to the engine oil reservoir.

14 Claims, 2 Drawing Sheets

(51) Int. Cl.
*F01M 5/00* (2006.01)
*F01M 11/00* (2006.01)

(56) References Cited

U.S. PATENT DOCUMENTS

| | | |
|---|---|---|
| 2009/0139207 A1 | 6/2009 | Reiners et al. |
| 2009/0229649 A1* | 9/2009 | Yang et al. .................... 136/201 |
| 2010/0154855 A1* | 6/2010 | Nemir et al. .................. 136/205 |
| 2010/0294231 A1* | 11/2010 | Kusel ......................... 123/196 R |
| 2011/0083831 A1 | 4/2011 | Richter et al. |
| 2011/0120106 A1 | 5/2011 | Brüch et al. |

FOREIGN PATENT DOCUMENTS

| | | |
|---|---|---|
| DE | 102010031554 A1 | 1/2012 |
| EP | 1038701 A2 | 3/2000 |
| EP | 2354487 A1 | 8/2011 |
| EP | 2495118 A2 | 3/2012 |
| GB | 2437089 A | 10/2007 |
| WO | 2010036914 A2 | 4/2010 |
| WO | WO 2011132035 A1 * | 10/2011 ................ F02G 5/02 |

* cited by examiner

THERMOELECTRIC DEVICE FOR OIL TEMPERATURE CONTROL

CROSS REFERENCE TO RELATED APPLICATIONS

The present application claims priority to United Kingdom Patent Application No. 1204083.8, filed on Mar. 8, 2012, the entire contents of which are hereby incorporated by reference for all purposes.

TECHNICAL FIELD

The present application relates to utilizing energy in hot exhaust gases.

BACKGROUND AND SUMMARY

The present disclosure relates to controlling oil temperature in a vehicle and/or generating electricity in a vehicle. In particular, but not exclusively, the disclosure relates to using a thermoelectric device to control oil temperature and generate electricity in a hybrid vehicle.

The known thermoelectric effect is the direct conversion of temperature differences to electric voltage. A thermoelectric device has a "hot side" and a "cold side" and creates a voltage when there is a different temperature on each side. However, a thermoelectric device can also be operated in a reverse mode in which, when a voltage is applied to the device, the device creates a temperature difference.

It is known to use thermoelectric devices in vehicles for the purpose of generating electricity. The cold side is thermally coupled to a heat exchanger and/or a supply of coolant. For instance, in US 2009/0139207 in the name of Reiners, the exhaust heat is applied to the hot side and the cold side is cooled by a cooling jacket which receives coolant that has passed through a heat exchanger.

Known thermoelectric devices in vehicles may be for the purpose of generating electricity and are not used in the reverse mode.

It is also known that the optimum fuel economy/emissions trade-off for an internal combustion engine is achieved when the coolant is colder than the oil temperature. However, during normal operation of the engine, the oil temperature is typically similar to the coolant temperature. To achieve a larger temperature differential between the oil and coolant, a large heat input to the oil is required. For a typical passenger car this would be around several kilowatts.

Roughly a third of the fuel energy is lost as waste heat in the exhaust gas. This is also at a relatively high temperature compared to the optimal oil temperature, especially during engine warm-up.

When starting from cold, an engine's combustion efficiency is reduced because the cold engine block draws heat out of the cylinder in the compression stroke.

For optimal fuel economy improvements and heat available to the engine for cabin heating, over two kilowatts of heat needs to be pumped into the engine oil during the first 400 seconds on the New European Driving Cycle (NEDC) (a test cycle performed on a cold vehicle typically run at 25° C.). Also, hybrid vehicles tend to have significantly slower warm-up rates and do not recover waste energy except on decelerations. It is desirable to provide a vehicle which is more fuel efficient. It is desirable to do this in a low cost manner without detracting from other functions, such as cabin heating, high heat rejection to the radiator and so on.

It is desirable to increase the warm-up rate of a vehicle, in particular for hybrid vehicles. According to a first aspect of the present disclosure there is provided a vehicle engine comprising: an engine oil reservoir; an exhaust gas system adapted to remove exhaust gas from the engine: and a thermoelectric device having a hot side and a cold side, wherein the thermoelectric device is configured such that the hot side is thermally coupled to the exhaust gas from the engine and the cold side is thermally coupled to the engine oil reservoir.

The present disclosure describes systems and methods to increase the speed of engine warm up by heating oil with a thermoelectric device and also to generate electricity using the same thermoelectric device, exploiting a temperature gradient between engine oil and exhaust gases. The disclosure describes a vehicle engine, comprising: an engine oil reservoir; an exhaust gas system; and a thermoelectric device having a hot side and a cold side and connected to a battery, wherein, the thermoelectric device is configured such that the hot side is thermally coupled to the exhaust gas system and the cold side is thermally coupled to the engine oil reservoir. A diverter valve and duct are provided in the exhaust gas system to selectively convey exhaust gases to the thermoelectric device located in or adjacent to the engine oil reservoir.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

The present disclosure allows heat to be transferred to the oil to increase the overall vehicle fuel economy, whilst also generating electricity. It is particularly beneficial for vehicles in cold climates, which have poor fuel economy due to warm-up and high electrical demands. Also, the extended warm up time of hybrid electric vehicles may be decreased by the object of the present disclosure. When heat is not required, no extra cooling of the system is required to avoid damage, and so there is no extra burden on the vehicle cooling system.

Figure 1:
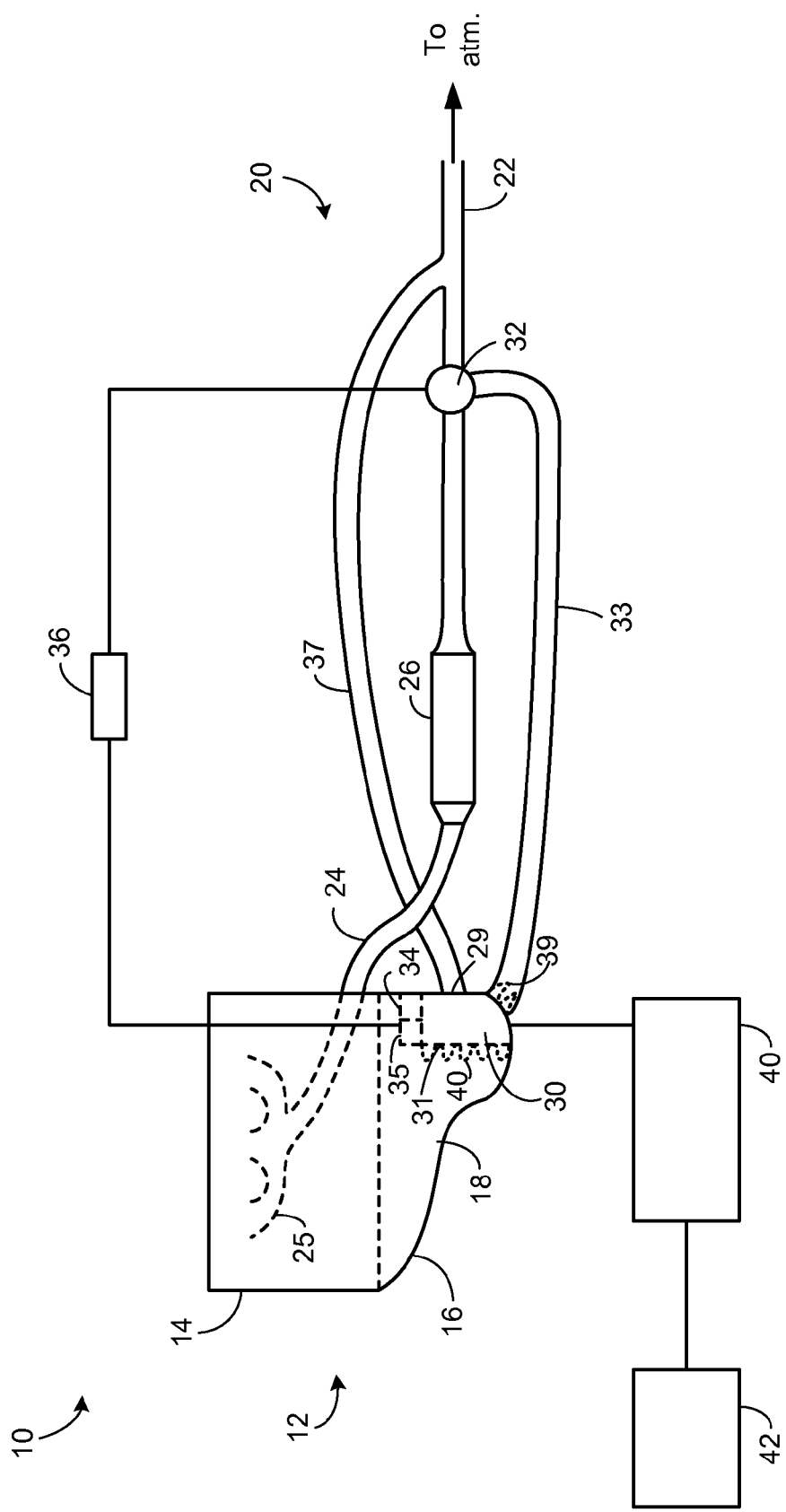
FIG. 1 is a schematic view of an engine system in accordance with the present disclosure.

FIG. 1 shows a vehicle engine system 10 comprising an engine 12. The combustion of fuel in air takes place in an upper part 14 of the engine 12 which produces exhaust gases. An exhaust gas system 20 is provided to remove the exhaust gas from the engine 12 and at least a portion of the exhaust gas is expelled to the atmosphere via an exhaust pipe 22, although a portion may be recirculated back to the engine cylinders by an exhaust gas recirculation system to reduce emissions.

A lower part 16 of the engine provides an oil reservoir or sump 18. Engine oil in the sump 18 is pumped upwards and used to lubricate the engine's moving parts in the upper part 14 before the oil flows downwards under gravity to collect again in the sump 18.

A thermoelectric device 30 having a hot side and a cold side is provided at the lower surface of the sump 18. The thermoelectric device 30 is configured so that the hot side 29 is thermally coupled to the exhaust gas from the engine 12 and the cold side 31 is thermally coupled to the oil within the sump 18 wherein the hot side is directly coupled to a wall of a passage of the exhaust gas system, without other components therebetween, and wherein the cold side is directly coupled to a wall of the reservoir, without other components therebetween. For example, the hot side of the device may be in face sharing contact with an external wall of an exhaust passage, and the cold side may be in face sharing contact with an external wall of the oil reservoir, opposite an internal wall in contact with oil.

The sump 18 may have a flat outer surface portion for close contact with the thermoelectric device 30. On its cold side 31, the thermoelectric device may further be attached to a lower surface of the oil sump. A wall of a passage of the exhaust gas system comprising the diverter duct 33 and the vent duct 37 may adjoin the hot side 29 of the thermoelectric device 30. In one example, the reservoir and exhaust passage may form, or attach to, a casing for the thermoelectric device. In an alternative embodiment, the thermoelectric device may be configured such that it is suitable to directly form a side of the reservoir and a wall of the exhaust gas passage.

The sump 18 may also have an inner surface portion which includes inwardly protruding fins to assist heat exchange between the sump 18 and the thermoelectric device 30. These fins 40 may comprise blades, or ridges at the interface of the thermoelectric device and the oil sump 18 to provide a greater surface area for heat exchange.

A diverter valve 32 is provided along the exhaust gas system 20 for diverting exhaust gas removed from the engine 12 and directing the exhaust gas towards the hot side of the thermoelectric device 30 via the diverter duct 33. A first duct 24 of the exhaust gas system 20 conveys exhaust gas from the exhaust manifold 25 to the diverter valve 32. When directed by the diverter valve 32 exhaust gas is conveyed, via diverter duct 33, to the hot side 29 of the thermoelectric device. Vent duct 37 directs exhaust gases back to the exhaust pipe 22. The diverter duct 33 may include internal fins 39 to assist the heat exchange. These fins may comprise blades, or ridges at the interface of the thermoelectric device and the diverter duct to provide a greater surface area for heat exchange.

The thermoelectric device 30 is electrically connected to a source of electricity in the form of a battery 40. In one example, the vehicle may be a hybrid vehicle including a motor 42 which can selectively be coupled to the vehicle powertrain, and the battery 40 is electrically connected to the motor 42.

The thermoelectric device 30 is operable in a first mode in which a temperature difference between the hot side and a cold side is utilized to generate electricity which is utilized within the vehicle. Therefore, this temperature difference across the hot exhaust gas and the engine oil within the sump 18. The generated electricity can be stored within the battery 40 or used to power engine or auxiliary components, such as a vehicle cabin heater. The battery may further be used to operate electrical systems such as power windows, seats, displays etc. In another embodiment the battery may store power which is later used to create heat in the cold side of the thermoelectric device to warm oil following an engine cold start.

The thermoelectric device 30 is also operable in a second mode in which, when electricity from the battery 40 is applied to the device 30, a temperature difference is created which generates heat. This generated heat is used to warm the engine oil to improve the fuel economy and/or emissions of the engine 12. This second mode may be particularly useful following an engine cold start.

A temperature sensor 34 is provided within the sump 18 for measuring engine oil temperature and a signal representative of the temperature is provided to a PID controller 36. An additional temperature sensor 35 may be used to measure the temperature of the thermoelectric device. The PID controller 36 is configured to control engine oil temperature in a number of ways, including by controlling operation of the diverter valve 32.

The PID controller 36 is communicatively connected to the diverter valve 32 and instructs the diverter valve 32 to open to direct removed exhaust gas to the thermoelectric device 30 when required. For instance, the diverter valve 32 can be instructed to open when the measured temperature is below a predetermined value, such as 130 degrees Centigrade. However, the PID controller 36 can be programmed to carry out more sophisticated control of the engine oil temperature. To maintain the oil temperature, and allow the thermoelectric device 30 to be operated when the oil is above the predetermined or a maximum temperature, two options are available. The first is to close the diverter valve 32 to remove the exhaust gas flow through the thermoelectric device 30, and the second option is to cool the oil via a separate radiator or allow heat to be transferred to a coolant in accordance with a normal oil coolant heat exchanger. This could be achieved using a simple oil or coolant bypass around the cooler.

Other sensors can be provided, such as a coolant temperature sensor or a thermoelectric device temperature sensor to prevent overheating of the thermoelectric device 30. These sensors can be coupled to the PID controller 36 so that the diverter valve 32 can be responsively closed to prevent exhaust gas being conveyed to the thermoelectric device 30 when the measured temperature is above a predetermined value. The exhaust gas system 20 includes a particulate trap 26 for removing deposits from the exhaust gas and the diverter valve 32 is located downstream of the particulate trap 26.

The engine may include at least one of a particulate trap, catalyst and a filter, and the diverter valve may be located downstream of the particulate trap, catalyst or filter such that removed exhaust gas which is directed towards the hot side of the thermoelectric device is substantially free of deposits or impurities.

To gain the most from heating the oil in the sump 18, the oil should be fed to the engine components with minimal heat transfer. To achieve this, the regular oil/coolant heat exchanger may be bypassed or not fitted.

In another embodiment, the thermoelectric device 30 may be located in a dry sump wherein the hot side is directly coupled to a wall of a passage of the exhaust gas system, without other components therebetween, and wherein the cold side is directly coupled to a wall of the reservoir, without other components therebetween. This would have the benefits of reduced heat loss from the oil before it is used in the engine.

The disclosure may allow for the downsizing of the alternator or battery 40, and this can reduce alternator load whilst cruising or accelerating, which again reduces fuel consumption.

The thermoelectric device may be connected to a source of electricity, such as a vehicle battery, alternator or the like.

The thermoelectric device may be operable in a first mode in which a temperature difference between the hot side and a cold side is utilized to generate electricity which is utilized within the vehicle. The generated electricity may be stored by the source of electricity.

The thermoelectric device may be operable in a second mode in which, when electricity from the source of electricity is applied to the device, the device creates a temperature difference to generate heat to be utilized within the vehicle. The engine may be adapted to utilize the generated heat to at least warm the engine oil.

The thermoelectric device may be located at or within the engine oil reservoir so that the cold side is thermally coupled to the engine oil reservoir.

The engine oil reservoir may comprise an oil sump of the engine. The engine oil reservoir may comprise a dry sump.

The engine oil reservoir may be adapted for attachment of the thermoelectric device. The engine oil reservoir may have an outer surface portion which is substantially planar to allow close contact with the thermoelectric device. The engine oil reservoir may have an inner surface portion which includes one or more fin members to assist heat exchange between the engine oil reservoir and the thermoelectric device. The thermoelectric device may be attached to a lower surface of the engine oil reservoir.

The exhaust gas system may include a first duct member adapted to convey exhaust gas from the engine. The first duct member may be in fluid communication with the thermoelectric device via a diverter valve. The first duct member may include one or more fin members to assist heat exchange between the first duct member and the thermoelectric device.

Figure 2:
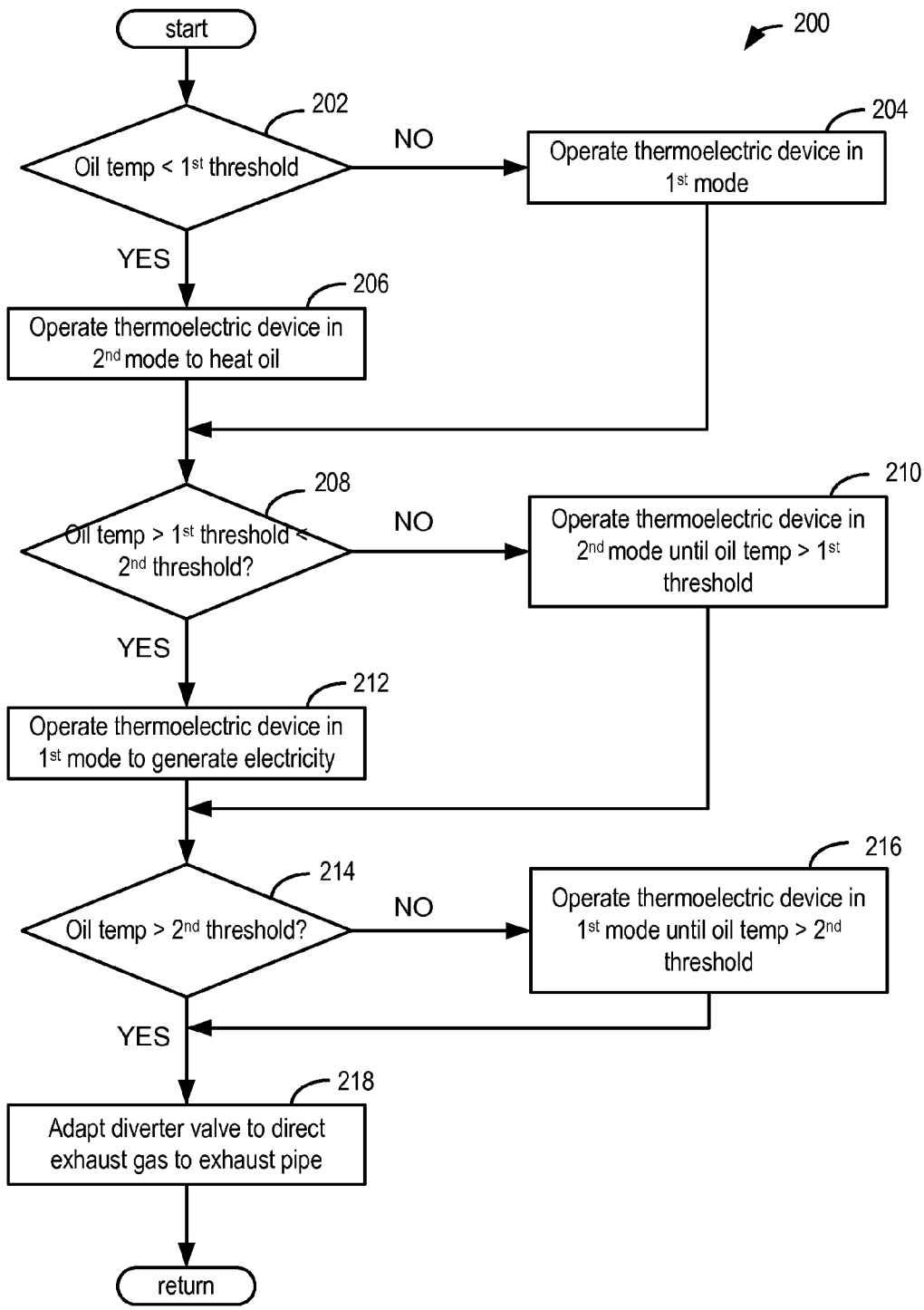
FIG. 2 is a high level flow chart describing a method of the present disclosure.

Referring now to FIG. 2 a method 200 for operating the above described systems is described. The method starts with an engine on event then proceeds to step 202. At step 202 it is assessed if the oil temperature is below a first threshold. The oil temperature may be measured by temperature sensor 34 and relayed to PID controller 36. If the oil temperature is not below the first threshold value (NO) the method proceeds to 204 where the thermoelectric device is operated in the $1^{st}$ mode where electrical energy is created from the temperature difference between the exhaust gases and the oil in the oil sump. If the oil temperature is below the first threshold temperature (YES) the method proceeds to step 206 where thermoelectric device is operated in the $2^{nd}$ mode where electricity from the battery is used to heat the oil within the oil sump.

The diverter valve may be adapted to direct removed exhaust gas towards the hot side of the thermoelectric device when the measured temperature, such as the engine oil temperature, is between a first and second threshold. The first and second thresholds may be 100 and 160 degrees Centigrade respectively. In an alternative embodiment the first and second thresholds may be 120 and 140 degrees Centigrade. Below the first threshold temperature the thermoelectric device may be operated in the second mode where it is utilized to warm engine oil. Above the second threshold temperature the diverter valve may be adapted to direct exhaust gas to exhaust pipe 22 bypassing diverter duct 33 when exhaust temperatures and oil temperatures are both high so that little energy can be converted by the thermoelectric device from a difference in temperatures. Also, any backpressure in the exhaust may be minimized when the diverter valve is adapted to direct exhaust gas flow to the exhaust pipe when there is no energy advantage to diverting exhaust gas to the thermoelectric device.

At step 208 it is determined if the oil temperature is greater than a first threshold and less than a second threshold. If the temperature of the oil is not greater than the first threshold (NO) the method proceeds to step 210 where operation of the thermoelectric device is maintained in the $2^{nd}$ mode where the oil is heated until the oil temperature is greater than the first threshold. If the oil temperature is greater than the first threshold and less than the second threshold (YES) the method proceeds to 212 where the thermoelectric device is operated in the first mode where the temperature difference between the hot exhaust gas on the hot side 29 and the less hot oil on the cold side 31 of the thermoelectric device 30 is converted to electricity which is stored in battery 40.

At step 214 it is determined if the oil temperature exceeds the second threshold. If the oil temperature does not exceed the second threshold (NO) the method proceeds to 216 where the thermoelectric device is operated in the first mode until the oil temperature exceeds the second threshold. If after 216 or at 214 the oil temperature does exceed the second threshold (YES) the method proceeds to 218 where the diverter valve 32 is adapted to convey exhaust gases directly to the exhaust pipe and not into diverter duct 33.

Oil temperature above the second threshold temperature may not have a large enough temperature difference from the exhaust gases for the thermoelectric device to create enough electricity to overcome any efficiencies resulting from backpressure due to the diverter valve directing exhaust gases towards the thermoelectric device.

The present disclosure describes systems and methods to increase the speed of engine warm up by heating oil with a thermoelectric device and also to generate electricity using the same thermoelectric device, exploiting a temperature gradient between engine oil and exhaust gases. The disclosure describes a vehicle engine, comprising: an engine oil reservoir; an exhaust gas system; and a thermoelectric device having a hot side and a cold side and connected to a battery, wherein, the thermoelectric device is configured such that the hot side is thermally coupled to the exhaust gas system and the cold side is thermally coupled to the engine oil reservoir. A diverter valve and duct are provided in the exhaust gas system to selectively convey exhaust gases to the thermoelectric device located in or adjacent to the engine oil reservoir.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
heating oil with a thermoelectric device when an oil temperature is below a first threshold;

generating electricity with the thermoelectric device when the oil temperature is between the first and a second threshold; and adapting a diverter valve to convey exhaust gas into an exhaust pipe and not a diverter duct if the oil temperature is above the second threshold.

2. The method as claimed in claim 1, wherein the first threshold is 100 degrees centigrade and the second threshold is 160 degrees centigrade.

3. The method as claimed in claim 1, wherein the first threshold is 120 degrees centigrade and the second threshold is 140 degrees centigrade.

4. The method as claimed in claim 1, wherein generating electricity further comprises utilizing energy from a temperature difference across the thermoelectric device between the oil temperature in an oil sump thermally coupled to a cold side of the thermoelectric device and exhaust gases in the diverter duct thermally coupled to a hot side of the thermoelectric device.

5. A method, comprising:
heating engine oil in a reservoir with a thermoelectric device when an oil temperature is below a first threshold;
generating electricity with the thermoelectric device when the oil temperature is between the first and a second threshold; and
adapting a diverter valve to convey exhaust gas into an exhaust pipe and not a diverter duct if the oil temperature is above the second threshold.

6. The method of claim 5, wherein the reservoir includes an outer surface portion which is planar in contact with the thermoelectric device.

7. The method of claim 5, wherein the reservoir includes an inner surface portion which comprises at least one fin.

8. The method of claim 5, wherein the reservoir comprises a dry sump, and wherein a hot side of the thermoelectric device is directly coupled to a wall of a passage of an engine exhaust gas system, without other components therebetween, and wherein a cold side is directly coupled to a wall of the reservoir, without other components therebetween.

9. The method of claim 8, wherein the engine exhaust gas system includes a diverter duct member.

10. The method of claim 9, wherein the diverter duct member includes one or more fin members.

11. The method of claim 9 further comprising selectively directing exhaust gas to the diverter duct member via the diverter valve.

12. The method of claim 11, wherein the diverter valve is controlled responsive to oil temperature.

13. The method of claim 11, wherein the diverter valve is selectively operable for selectively directing exhaust gas to the hot side of the thermoelectric device.

14. The method of claim 13, wherein the diverter valve is located downstream of a particulate trap.

\* \* \* \* \*